United States Patent
Gandhi et al.

(10) Patent No.: US 10,842,325 B2
(45) Date of Patent: Nov. 24, 2020

(54) GRAIN DISPENSER

(71) Applicants: Sima Gandhi, Mississauga (CA); Naya Hofer, Mississauga (CA)

(72) Inventors: Sima Gandhi, Mississauga (CA); Naya Hofer, Mississauga (CA)

(73) Assignee: Sima Gandhi, Mississauga (CA)

( * ) Notice: Subject to any disclaimer, the term of this patent is extended or adjusted under 35 U.S.C. 154(b) by 121 days.

(21) Appl. No.: 16/090,457

(22) PCT Filed: Mar. 31, 2017

(86) PCT No.: PCT/CA2017/050400
§ 371 (c)(1),
(2) Date: Oct. 1, 2018

(87) PCT Pub. No.: WO2017/165979
PCT Pub. Date: Oct. 5, 2017

(65) Prior Publication Data
US 2019/0117023 A1    Apr. 25, 2019

Related U.S. Application Data

(60) Provisional application No. 62/316,290, filed on Mar. 31, 2016.

(51) Int. Cl.
*A47J 43/28* (2006.01)
*B07B 1/02* (2006.01)
*G01F 19/00* (2006.01)

(52) U.S. Cl.
CPC ............ *A47J 43/288* (2013.01); *A47J 43/28* (2013.01); *B07B 1/02* (2013.01); *G01F 19/002* (2013.01)

(58) Field of Classification Search
CPC ....... A47J 43/288; A47J 43/28; G01F 19/002; B07B 1/02
USPC .......................................................... 209/283
See application file for complete search history.

(56) References Cited

U.S. PATENT DOCUMENTS

| | | | |
|---|---|---|---|
| 50,025 A * | 9/1865 | Myers | A47J 43/22 209/282 |
| 54,857 A * | 5/1866 | Carrer | B07B 1/20 209/283 |
| 1,882,645 A | 10/1932 | Kail | |
| 1,966,089 A | 7/1934 | Chester | |
| 2,013,265 A | 9/1935 | Chester | |
| 2,055,394 A * | 9/1936 | Thomas | A47J 43/22 209/283 |
| 2,190,987 A | 2/1940 | Jackson | |
| 3,627,128 A * | 12/1971 | Ostrowsky | A47J 43/22 209/236 |
| D708,489 S * | 7/2014 | Perry | D7/667 |

OTHER PUBLICATIONS

International Search Report dated Jun. 19, 2017 in connection with PCT/CA2017/050400 filed Mar. 31, 2017.

* cited by examiner

Primary Examiner — Patrick H Mackey
(74) Attorney, Agent, or Firm — Kramer & Amado, P.C.

(57) ABSTRACT

A device for handling seeds and grains, suitable for use in food processing and/or preparation, is disclosed. This device features a semi-spherical bowl with perforations, a wiper that is activated by engaging the handle, and measuring lines on the semi-spherical bowl.

4 Claims, 7 Drawing Sheets

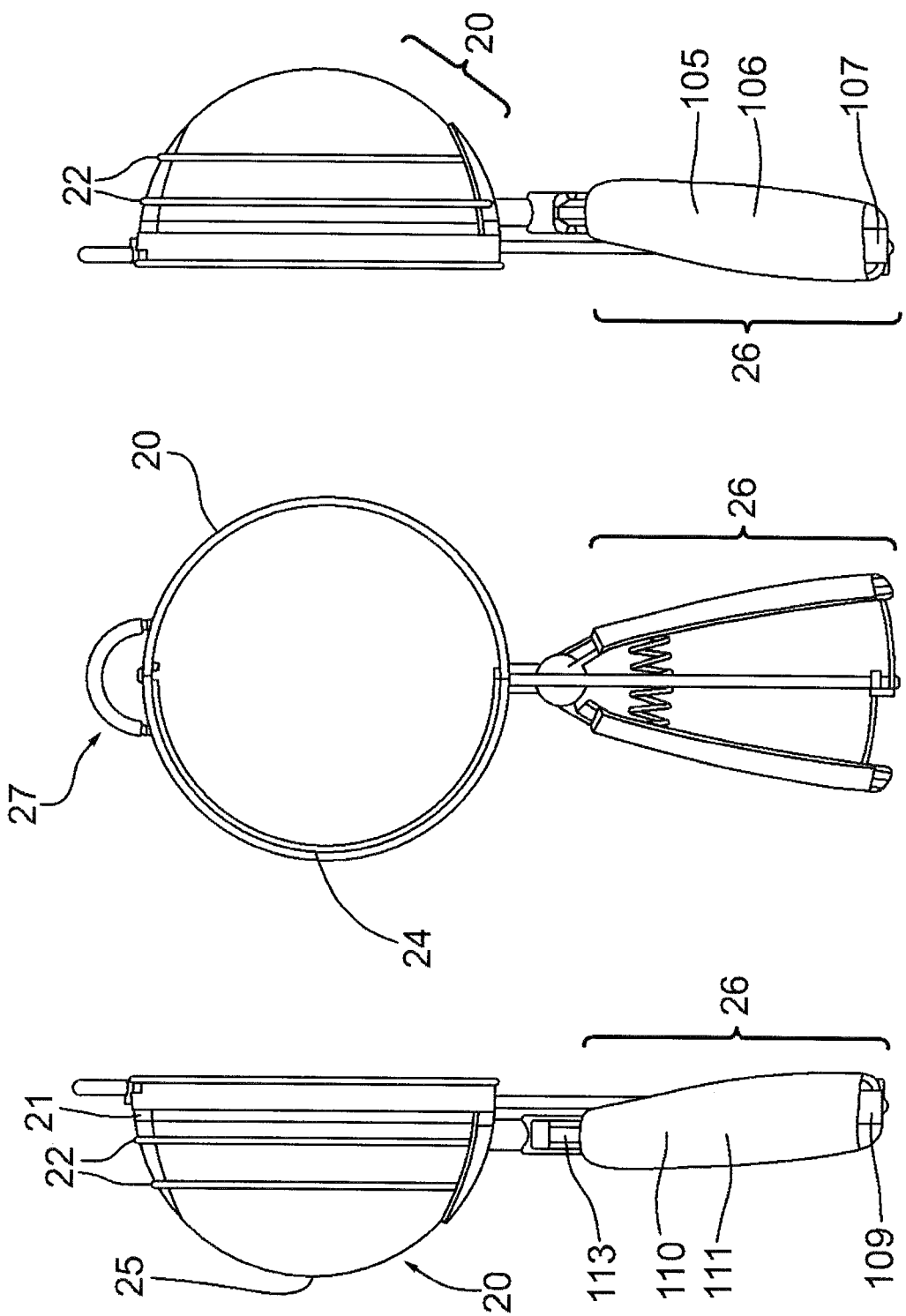

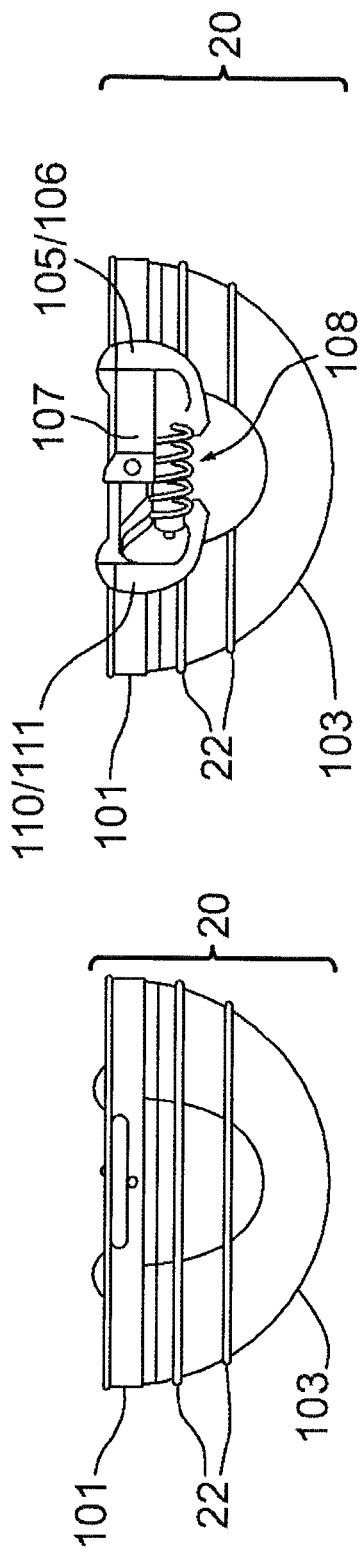

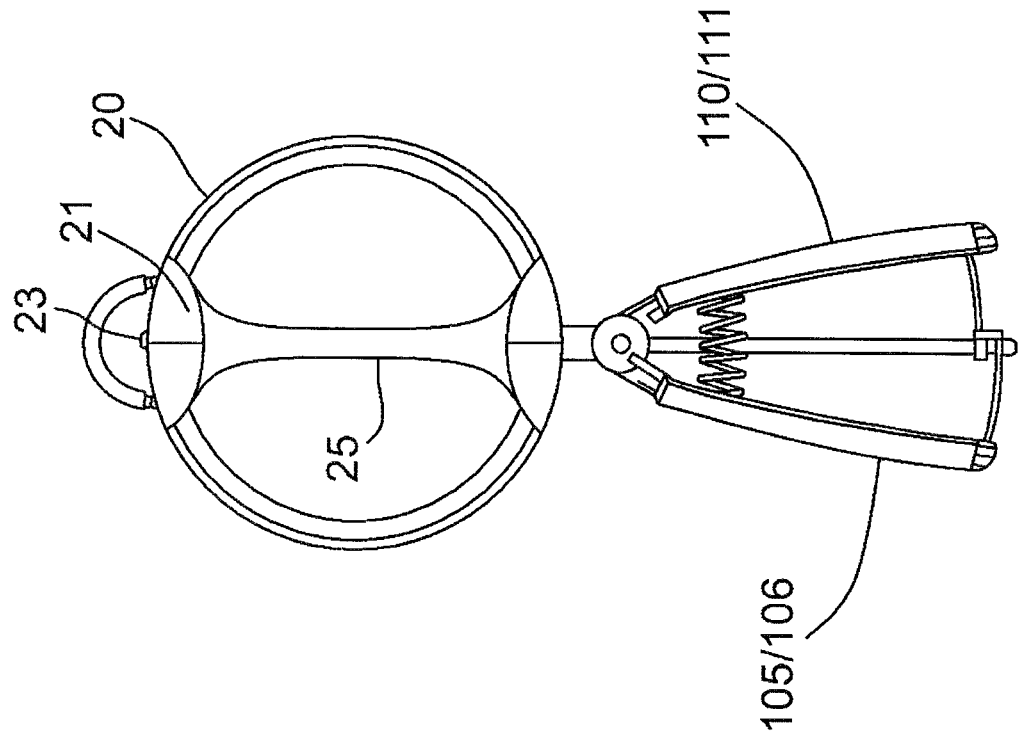
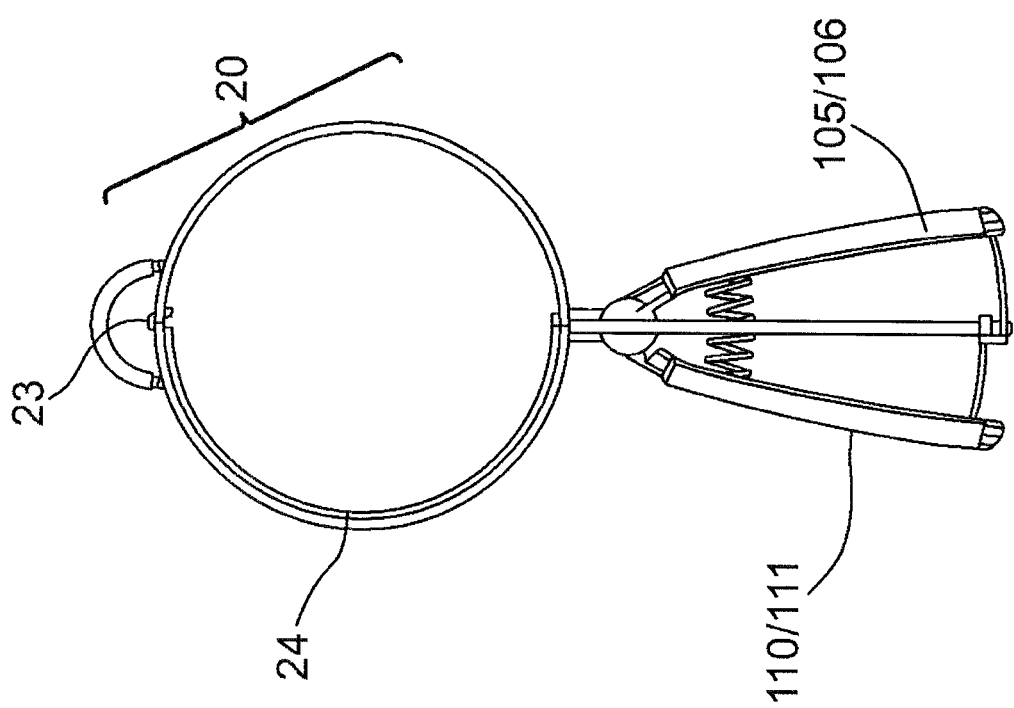

GRAIN DISPENSER

TECHNICAL FIELD

This invention relates to a device for handling seeds and grains, typically used for food processing and/or preparation.

BACKGROUND

Various types of processing operations are typically performed on foodstuffs prior to their preparation. For example, foodstuff such as vegetables, fruits, meats, fish and the like are often measured, cleaned, sliced, chopped or otherwise cut in preparation for cooking and/or serving.

Given the rise in popularity of seeds and grains such as lentils such as quinoa, farrow, hemp seeds, Chia, teff, Kamut, mung bean, chick peas, cranberry bean, lespedeza, tuvr lentil, split red lentil, split Bengal gram or pulses, there is a large and growing desire among consumers to process and handle such seeds and grains.

A person typically uses a range of devices to facilitate such processing and handling, such as scoops, measuring cups, colanders, knives, strainers, or spatulas. These devices all need to be properly cleaned, sanitized, stored and retrieved for practical and safe use. Also, the use of these separate devices in the preparation, particularly the cleaning, of seed and grain-based foods usually results in imprecision in measurement and the loss of seeds and grains unless extra care is taken in the use of these devices.

SUMMARY

The device described in this application was invented to be used with the wide variety of seeds, grains, lentils, and rice that have grown in popularity and are now often used in households. (However, the device is not restricted to use with these products.) This invention is a new tool for measuring, separating, washing and dispensing particulate matter for the purpose of removing or filtering unwanted components (usually but not always contaminants). Washing these grains, seeds, rice and lentils also removes excess starch that creates a sticky texture, bitter or soapy-tasting coatings, or even naturally occurring substances like arsenic or saponins (sometimes referred to as anti-nutrients).

The device is a sophisticated and ergonomic implement. It is a multi-functional yet simple device for measuring, separating, washing and discharging it contents. The semi-spherical scoop/head of the device includes measurement indicator lines, is primarily made of a perforated mesh and includes a built-in wiper assembly. The perforated mesh is sized to contain wanted particles in the scoop/head and separates the unwanted smaller particles [contaminants, anti-nutrients, dirt, dust, bacteria, starch] by allowing them to filter through the perforations. The wiper assembly aids to discharge the wanted particles from the scoop/head at the same time minimizing waste as a result of contents sticking to the scoop/head or floating out with waste water. The wiper assembly is shaped and constructed to better achieve this result.

A squeeze or trigger enabled handle attached to the semi-spherical scoop/head facilitates the rotation of the wiper assembly. The wiper assembly aids in the discharge of cleaned seeds/grains/lentils/rice/other. These features allow the implement to perform multiple and varied operations. The squeeze or trigger enabled handle is suited for both right handed and left handed operation.

In accordance with the present invention, there is provided a device comprising a perforated semi-spherical mesh container; the perforated semi-spherical mesh container bearing at least one measurement indicator line; a wiper aligned to closely slide along the inner surface of the perforated semi-spherical mesh container when rotated; and means for rotating said wiper. In an aspect of the invention, the means for rotating said wiper comprises a handle adapted so that squeezing the handle rotates the wiper. In another aspect, the perforated semi-spherical mesh container has hemispherical shape and the wiper has an outside circumference that is almost equal to the inside circumference of said perforated semi-spherical mesh container, said wiper being pivotally mounted to said perforated semi-spherical mesh container, whereby said outer scoop and inner wiper generally form a hemisphere when pivoted so that their respective concave sides face in the same direction. In another aspect of the device, the wiper is made with a flat edge that curves upwards in the middle, arranged so that the flat edge slides along the inside circumference of the mesh container, and the wiper is made of a plastic, silicone or rubber material. In yet another aspect of the invention, a reinforcing strip runs along a half circle of the outer surface of the semi-spherical mesh container.

BRIEF DESCRIPTION OF THE DRAWINGS

In order to better understand various exemplary embodiments, reference is made to the accompanying drawings, wherein:

FIG. 1A is a top plan view of a first embodiment of the device;

FIG. 1B is a right side view of a first embodiment of the device;

FIG. 1C is a left side view of a first embodiment of the device;

FIG. 1D is an end view of the first embodiment of the device from the end of the device opposite the handle;

FIG. 1E is an end view of a first embodiment of the device from the end of the device with the handle;

FIG. 3A is a top plan view of a second embodiment of the device;

FIG. 3B is a bottom view of a second embodiment of the device;

DETAILED DESCRIPTION

Figure 2:
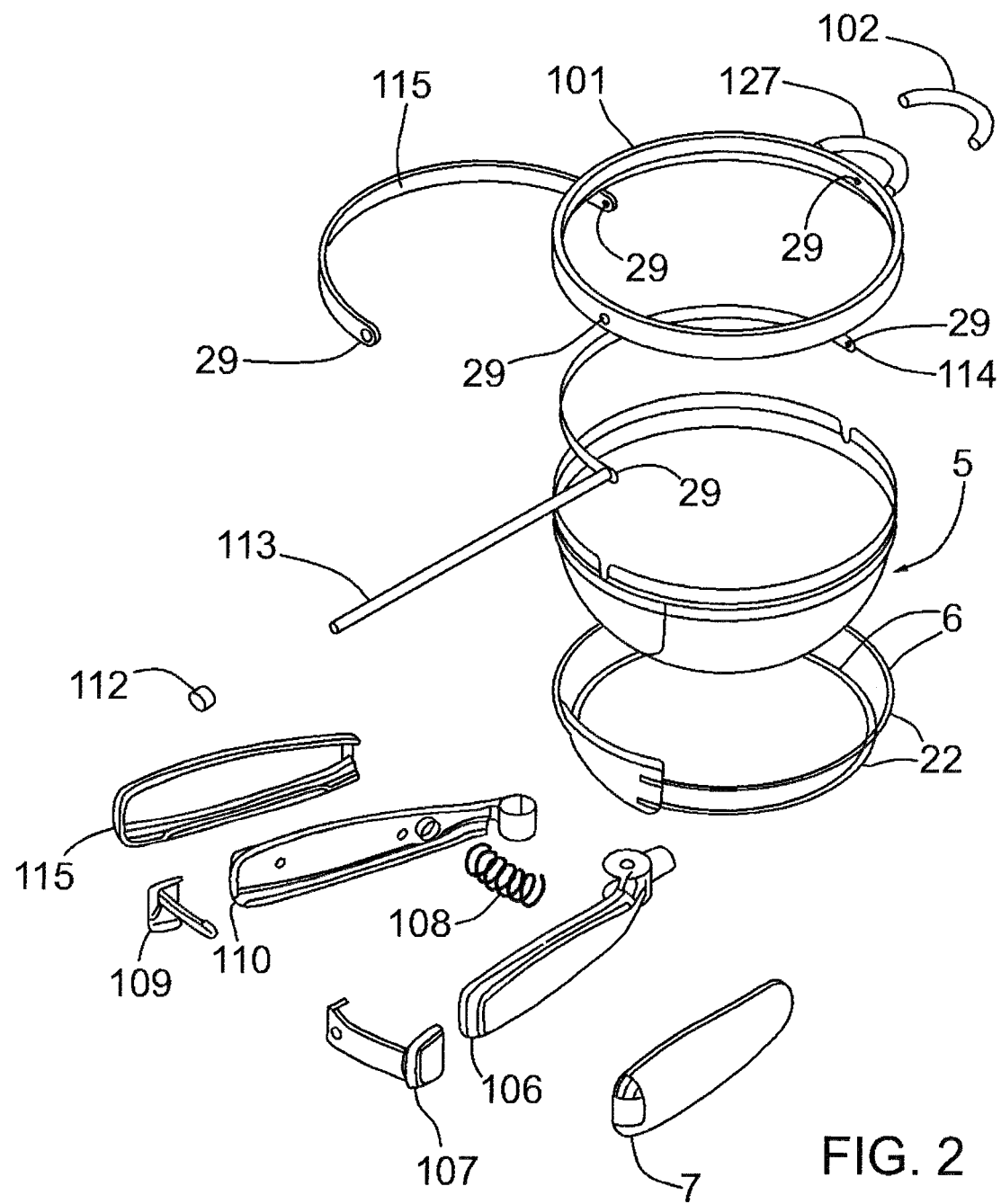
FIG. 2 is an exploded view of the first embodiment of the device as illustrated in FIGS. 1A-1E.

This device was invented to address the wide variety of seeds, grains, lentils, and rice that have grown in popularity and are commonly used in many households. However, the device is not restricted to use with these products.

These food products require accurate measurement for successful product preparation results. These food products often have remnants of dirt, bacteria, waste or other unwanted by-products, and should be washed before being consumed. Further, some of these foods come with naturally occurring detergents or saponins and washing these prior to preparation will result in foods that are tastier, have better consistency and will not cause adverse health reactions when consumed.

Desirable steps in the preparation of seeds and grains for food preparation include:
1. Filtering the seeds/grains.
2. Separating contaminants from the seeds/grains.
3. Measuring precise, specific and multiple quantities of the seeds/grains.
4. Dispensing the seeds/grains with minimum effort
5. Cleaning and dispensing the seeds/grains with minimum waste
6. Ambidextrous, one handed operation The standard alternative to using this device is to use (at least) 3 separate kitchen tools. This one device replaces a measuring cup, a sieve and a spatula. Often, a sieve cannot be found that is both the right size to hold the portions needed and/or the perforations are too large for the seeds or grains in question. By using this device, waste of these expensive seeds and grains is minimized, and clean-up is reduced to cleaning one device rather than three, reducing the use of water, time and effort, and encouraging the consumption of these nutritious foods economically and efficiently.

The design includes a protruding tip to allow the implement to rest on top of a vessel for soaking of the seeds, grains, lentils, and rice as needed. This tip doubles as a hook for hanging storage of the implement.

The invention is an ergonomic implement, and is designed to be used with either the left or right hand. It is a multifunctional yet simple device for measuring, washing and discharging it contents. The device is similar in look to an ice cream scoop, but differs significantly in purpose, construction and utility. The device allows the measuring, washing and discharge of contaminants from seed, grain, lentil, rice and other particulate matter in one simple procedure with only the one device.

While originally conceived for culinary use, the implement may also have uses in pet care, science laboratories and industrial applications.

FIGS. 1A to 1E show several views of a first embodiment of the device.

Turning to FIG. 1A, there is a semi-spherical 'head' or 'scoop' 20 of the device. Semi-spherical 'head' or 'scoop' 20 is made of a mesh material to allow water and waste to flow through during washing.

The semi-spherical 'head' or 'scoop' 20 of the device houses a wiper assembly 24 that matches the inside radius of the scoop 20, and pivots to discharge the contents out of the scoop 20 when the washing step is complete. As the wiper assembly discharges the contents, it is designed to minimize wasted particles left sticking to the scoop/head.

Figure 5A:
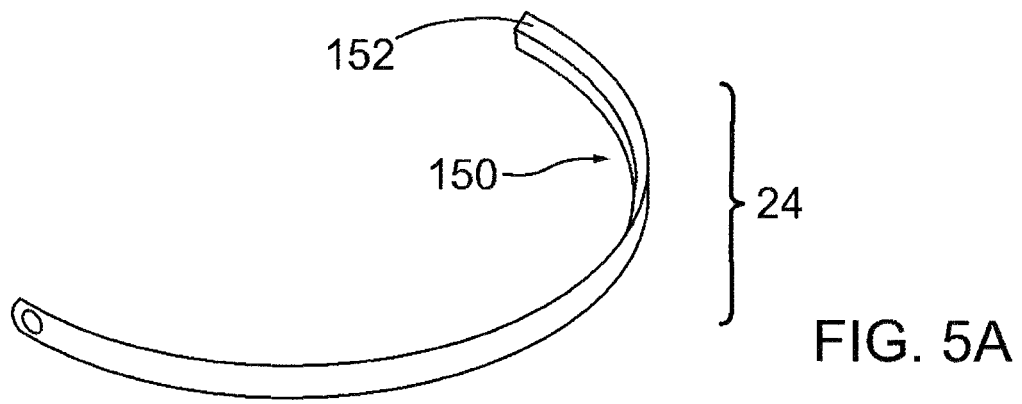
FIG. 5A is a perspective view of the wiper assembly.
Figure 5B:
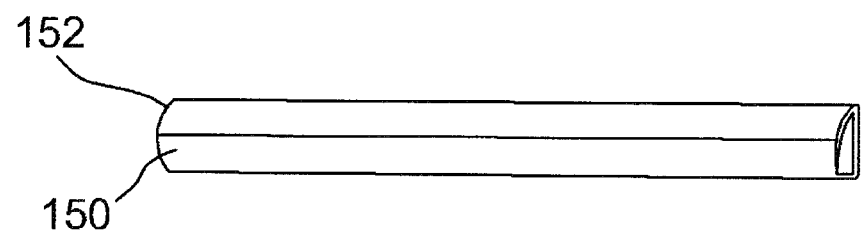
FIG. 5B is a view of a piece of the wiper assembly illustrating the flattened front edge and a convex curved elevated portion.

In some prior art scoops with wipers (primarily solid cups used to dispense ice cream or cookie dough), the wiper is made from metal material that is either curved or flat in profile, but not both. In contrast, wiper assembly 24 is made of a flat material with a profile that curves upwards in the middle. Turning to FIGS. 5A and 5B, wiper assembly 24 has a flattened front edge 150 and a convex curved elevated portion 152 projecting from the front edge then tapering back to a flat surface. (In FIGS. 5A and 5B, the convex curved elevated portion 152 is illustrated as having two sections, but the convex curved elevated portion 152 can also be a continuous curve with no distinctive sections, or could be implemented with more than two distinctive portions) The flattened front edge 150 allows the bowl contents to be captured and scooped into the curved section 152. As the arm is triggered, the scooped edge of the wiper assembly 24 forces the contents of the bowl to be discharged out of the implement. When used to dispense grains or seeds (generally the device will be turned upside down or at least on an angle), the flat edge 150 of wiper assembly 24 makes initial contact with the grains, picks them up and delivers them to the upward slant of the same wiper assembly. The shape of the curve pushes the contents upwards to ease the discharge out of scoop or head 20. When used to dispense grains or seeds, the flat edge 150 of wiper assembly 24 is shaped to closely follow the interior surface of semi-spherical scoop 20 and makes initial contact with the grains, picks them up and delivers them to the upward slant 152 of the wiper assembly. This is different from what will be typically seen in prior art ice cream scoops, and is designed to work specifically with seeds and grains.

The dimensions and radii of the wiper assembly 24 should be designed to reflect the seeds/grains to be dispensed and the size of the device.

The wiper assembly can be constructed out of stainless steel, or may be constructed with a silicone over mold.

As illustrated, the wiper assembly sweeps from left to right. The wiper assembly can also be designed to sweep from right to left.

Figure 6A:
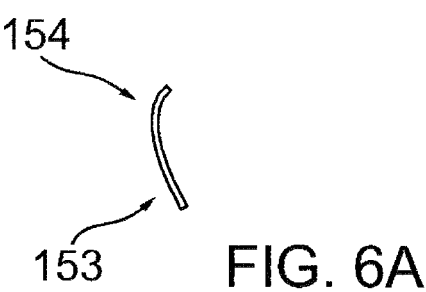
FIG. 6A is a profile view of a second embodiment of the wiper assembly.
Figure 6B:
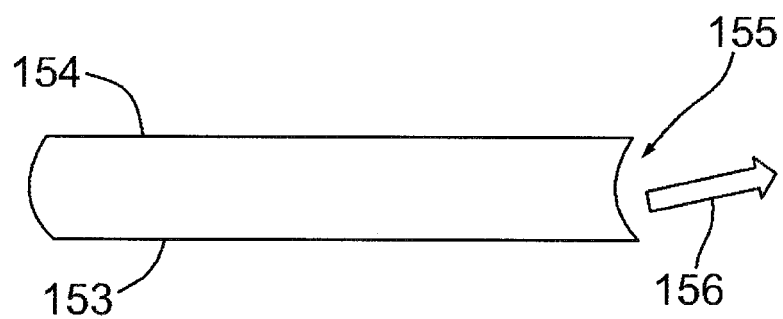
FIG. 6B is a view of a piece of the second embodiment of the wiper assembly illustrating the concave shape.

In a second embodiment, the wiper assembly can be shaped similarly to a snow shovel, with a concave front that makes initial contact with the grains, picks them up and delivers them to the edge of the same wiper assembly. This is different from what will be typically seen in prior art ice cream scoops, and is designed to work specifically with seeds and grains. Turning to FIGS. 6A (a profile view of the second embodiment) and 6B, it may be seen that the second embodiment has a flatter bottom edge 153 and a top curved surface 154, and surface 155 that is a concave surface. This second embodiment of the wiper assembly has a hopper-like concave surface 155 and flatter bottom edge 153 designed to scoop and slide along the inner surface of mesh 5 in direction of movement 156.

A person skilled in the art will recognize that there are alternative profiles of the wiper assembly that could be used successfully in this device.

Turning to FIGS. 1B and 1C, side views of the first embodiment of the invention, the semi-spherical 'scoop' 20 of the device includes multiple measurement indicator lines 22 on the outside surface for accurate measurement of the seeds and grains in predetermined quantities. In the embodiment of FIGS. 1B and 1C, the indicator lines take the form of metal rings that are attached to the scoop 20. However, in other embodiments the indicator lines can be implemented in other ways, such as a line drawn or imprinted directly on the mesh, and indentation, or a colouration of the mesh itself (referring to FIG. 1B, the mesh located beneath the lowest indicator line 22 could be a first colour, and the mesh located between the indicator lines 22 could be a second colour, and the mesh above the highest indicator line 22 could be uncoloured).

Indications of the volumes corresponding to the indicator lines may be written or imprinted somewhere on the device—most logically, on the handle end of the scoop 20.

FIGS. 1D and 1E are end views of the first embodiment of the inventive device.

A handle 26 attached to the head 20 facilitates the rotation of the wiper assembly. Applying pressure to the handle 26 triggers the pivoting of the wiper assembly 24, resulting in discharge of the contents of the scoop.

Optionally, a ring 27 may be present to act as a hanger and pot rest, to allow for handling and hanging of the device. Ring 27 can (as seen in FIG. 2) incorporate a stainless steel ring 127, which is optionally covered by a an optional silicon over mold 102. While a ring 27 is illustrated in the figures, a person skilled in the art will know of many alternatives that can be used to allow the device to be hung or balanced on an edge (for example, balanced over a sink).

These features allow the device to perform multiple and varied operations. For example, a user can measure an accurate volume of grains using the indicator lines 22. The grains may then be washed by placing the scoop head 20 under a stream of water, allowing contaminants to be washed out through the mesh scoop 20. After this step, the grains may be removed from scoop 20 with minimal spillage or loss of grains by rotating wiper assembly 24 by actuating handle 26.

There are several ways this device could be effectively implemented. The mesh in scoop 20 must have a mesh size small enough to retain the grains in scoop 20 during washing, but should be large enough to allow contaminants to wash out. Since the grains or other items to be washed vary in size, embodiments with different mesh sizes are possible and in some cases desirable. The choice of materials and construction can also vary. It is desirable for the materials to be chosen to reduce the sticking of the grains inside scoop 20, particularly when wet. Such materials can also be chosen for ruggedness and appearance. Wiper assembly 24 should be machined or designed to give an efficient wipe of scoop 20. Finally, the choice of materials and design should result in a device that is easy to manufacture but resilient and resistant to breaking, and resistant to rusting.

In a particular embodiment, the mesh 5 in scoop 20 can be as small as 0.50 mm and as large as 2.00 mm. In another embodiment, the mesh is a square pattern to prevent contents from falling through. Examples of the type of mesh that could be used is a wire-woven or twill mesh. The size of the mesh can be selected to reflect the size of the specific grains or seeds being dispensed. For example, Chia seeds usually have a diameter of around 0.8 mm, so a mesh of 0.75 mm would be appropriate. For devices for general use, the preferred mesh size is designed to reflect the smallest size of grains, and will still work with grains of larger size.

In a specific embodiment, the mesh 5 is SAE 304 stainless steel, 18 by 0.17 twill pattern.

In another embodiment, the measurement indicator lines may reflect scoops with volumes from 1 teaspoon (4.92892 ml) to 5 cups (1182.94 ml) or larger for commercial uses.

The device may be constructed from higher purity materials when used for science related applications.

FIG. 2 is an exploded view of the first embodiment of the device. Turning to FIG. 2, scoop 20 incorporates a stainless steel mesh bowl 5. Fitting around mesh bowl 5 are measurement rings 6, made of stainless steel, which are embodiments of measurement indicators 22. Measurement rings 6 are designed so that when combined with mesh 5, measurement indicators 22 (equivalently, rings 6) indicate useful volumes contained in mesh 5. Wiper assembly 24 is made of wiper insert 114, which is made of stainless steel, and wiper overmold 115, which is made of silicone (but could also be made of plastic or rubber). Wiper insert 114 and wiper overmold 115 are attached to mesh 5 by a rim 101, made of stainless steel. Wiper insert 114, wiper overmold 115 and rim 101 attach at points 29.

This embodiment includes a ring 27 (as shows in FIG. 1A), which is constructed from ring 127 which is built in to rim 101 and is covered by ring overmold 102, which is made of silicone (but could also be made of plastic or rubber).

Wiper insert 114 is rotated by a handle, which is constructed from spring 108, right frame 106 and left frame 110, lock 107, teeth 109, and gear 112. These are all made of stainless steel. A semi-circular wiper insert 114 is pivotally mounted at opposite ends of the scoop/head, a shank 113 is secured to one end of the scoop/head, and handles 106, 110 are mounted at either side of the shank attached to the wiper insert. When handle is squeezed the teeth engage with a gear 112 and the wiper mechanism is rotated to dispense the contents from the scoop/head. One end of the shaft projects into an articulate slot to limit rotation of the wiper. Spring 108 is in place to ensure return of the handles to the initial position. Right frame 106 is covered by right overmold insert 105, which left frame 110 is covered by left overmold insert 111. Right overmold insert 105 and left overmold insert 111 are made of silicone (but could also be made of plastic or rubber or wood). In an alternative embodiment, the handles have silicone mold inserts or inlays instead of overmolds.

The wiper assembly 24 is designed with a metal wiper insert 114 and an optional overmold of silicone or similar plastic or rubber material 115. The metal component ensures strength and rigidity of motion. The optional plastic/rubber over mold 115 is designed to ensure full discharge of all the desired seeds, grains etc. Full discharge occurs by the specific friction between the plastic/rubber overmold of the wiper and the mesh of the scoop/head, which will increase pressure on sticky grains as the handle is squeezed and the overmold deforms. This design also avoids issues with metal on metal friction between the wiper and mesh.

In one embodiment, scoop 20 has an outside diameter of 146.41 mm and a depth of 79.78 mm, the rim 2 has a thickness of 3.52 mm, the wiper insert 114 has a thickness of 1.35 mm, left and right handle overmolds 105 and 111 are 120.86 mm, and are 11.23 mm thick and 39.79 mm wide. Shank 113 has a diameter of 5 mm. The device has a total length of 305.47 mm. If a ring 27 is present it may have a diameter of 45.93 mm. In another embodiment, the wiper insert 114 has a thickness of 2.5 mm, but the other dimensions of the device are the unchanged.

These dimensions may be scaled up or down to produce semi-spherical scoops 20 of different sizes. For example, the scoops 20 may be sized to allow measurement indicator lines 22 to measure volumes from 1 teaspoon (4.92892 ml) to 5 cups (1182.94 ml) or larger (the latter would probably be for commercial uses). The dimensions quoted above can be varied as long as the functionality of the device is not defeated. For example, changes may be made in the length, or width of the handles (or the shape of the handles) without changing the functionality of the scoop, wiper and measurement indicators. One design factor which is important is that the wiper should be sized to closely match the inner surface of the semi-spherical scoop. While it is best if the wiper in its range of motion covers most if not all of the inner surface of the semi-spherical scoop, the device will still work if the range of motion of the wiper covers a significant portion of the inner surface of the semi-spherical scoop.

The inventive device is designed so as to be manufactured using conventional and new forms of manufacturing, and to provide an implement that is economically feasible, long lasting and relatively trouble free in operation.

Figure 3C:
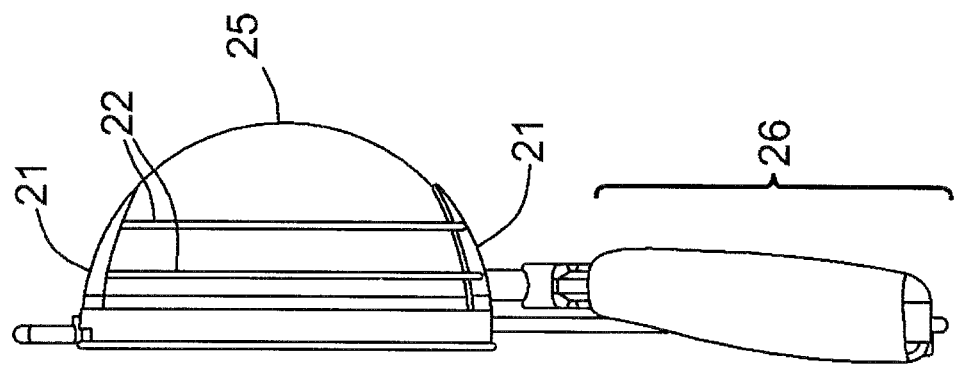
FIG. 3C is a right side view of a second embodiment of the device.
Figure 3D:
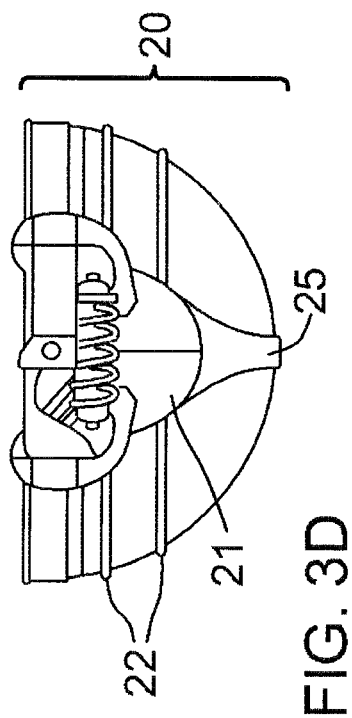
FIG. 3D is an end view of the second embodiment of the device from the end of the device with the handle.
Figure 3E:
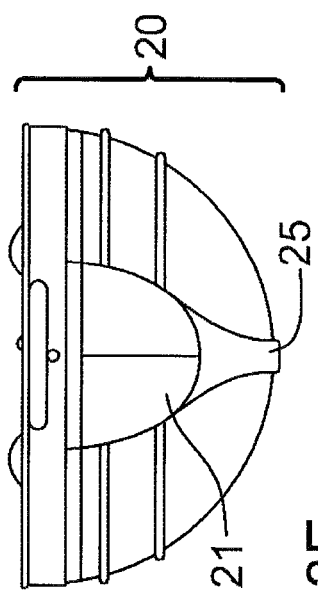
FIG. 3E is an end view of the second embodiment of the device from the end opposite the handle.
Figure 4:
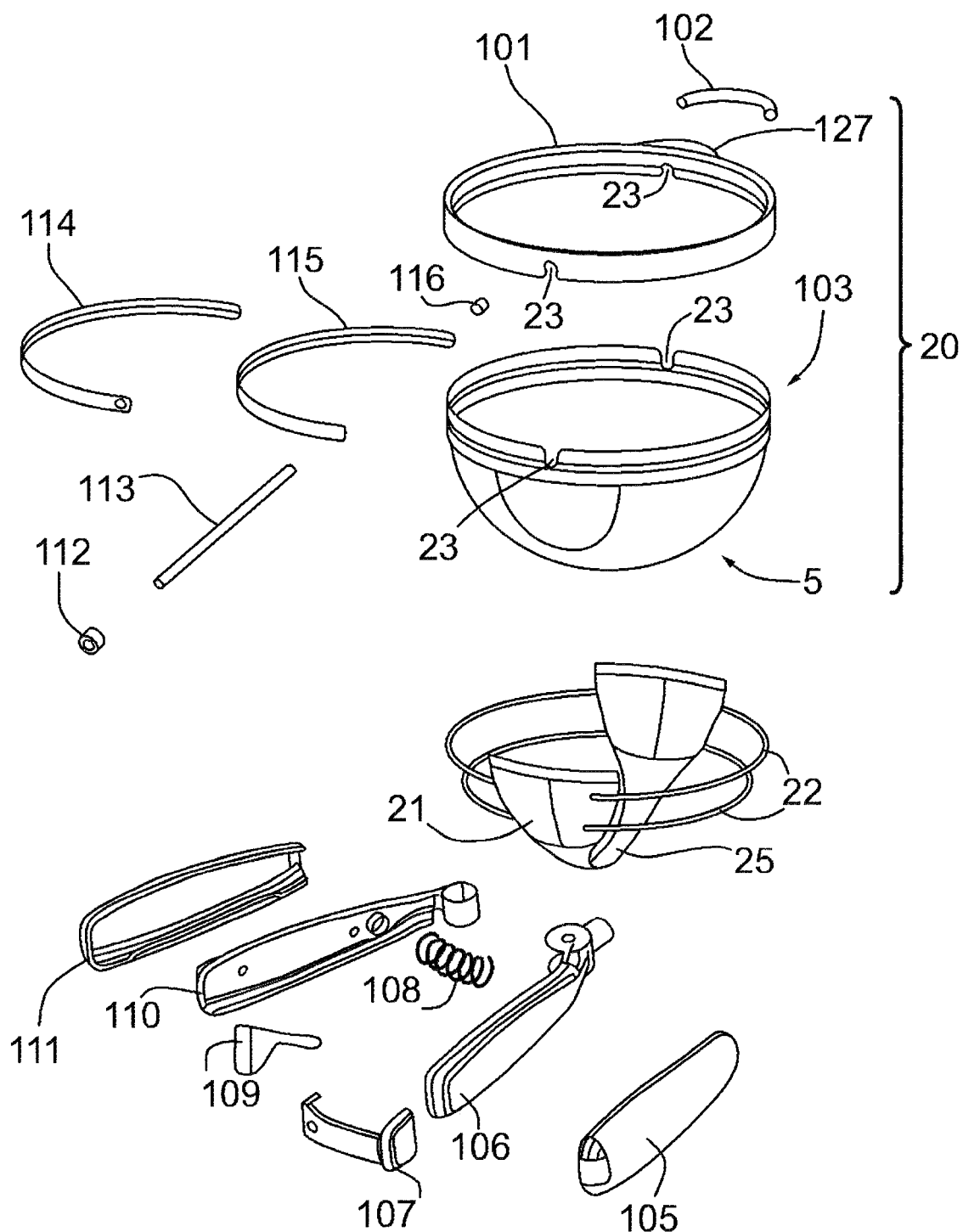
FIG. 4 is an exploded view of the second embodiment of the device as illustrated in FIGS. 3A-3E.

A second embodiment is illustrated in FIGS. 3A to 3E and 4. FIG. 3A is a top view of the second embodiment. Turning to FIG. 3B, a bottom view of the second embodiment, a reinforcing strip of metal 21 and 25 has been added to the underside of scoop 20. FIG. 3C is a right side view of the second embodiment, and FIGS. 3D and 3E are end views, all illustrating the placement of the reinforcing strip 25 and reinforcing plate 21. Turning to FIG. 4, reverse slots 23 have been added to the rim 101 and mesh 103 to allow ease of assembly of the product. Measurement lines 22 are secured to both sides of scoop 20 with the wide portion of reinforcing plate 21 that attaches to rim 103.

The reinforcing plates 21 and 25 add significant durability to the device. Over time, through shipping, use, cleaning and storage, the mesh 5 can become dented, stretched or otherwise damaged, which will reduce the ability of the wiper assembly to effectively remove the grains and seeds from the device, and will also cause the measurement lines 22 to become inaccurate. The reinforcing plates 21 and 25 act to reduce such damages by supporting the mesh 5 and because the plate 25 covers the mesh 5 at the locations where the device is most likely to contact a surface when the device is placed down.

Reinforcing plates 21 and 25 also allow the better use of a less tense, less rigid mesh 5, which is less expensive than a mesh with more tension or a more rigid mesh.

In more detail, the second embodiment illustrated in FIG. 4 has a finishing rim 101 that fits onto rim 103 and mesh 5, which in turn fits into reinforcing plate 21 and 25. Ring overmold 102 fits onto (optional) ring 127. The wiper assembly includes a wiper insert 115 made out of metal, a wiper overmold 114 made out of plastic or silicone or rubber, gear 112, gear shank 113, spring 108, plate with lock 107, plate with notches 109.

Wiper 114 and wiper insert 115 is rotated by a handle, which is constructed from spring 108, right frame 106 and left frame 110, lock 107, teeth 109, and gear 112. These are all made of stainless steel. The semi-circular wiper insert 114 is pivotally mounted at opposite ends of the scoop/head. A gear shank 113 is secured to one end of the scoop/head 20, runs in between handles 106, 110 and runs through gear 112, plate with notches 109 and plate with gear lock 107. When the handle is squeezed the teeth or pinion engage with a larger gear 112 and the wiper mechanism is rotated to dispense the contents from the scoop/head. One end of the shaft projects into an articulate slot 107 to limit rotation of the wiper. Spring 108 is in place to ensure return of the handles to the initial position. Right frame 106 is covered by right overmold insert 105, which left frame 110 is covered by left overmold insert 111. Right overmold insert 105 and left overmold insert 111 are made of silicone (but could also be made of plastic or rubber). Right overmold insert 105 and left overmold insert 111 are optional. Right overmold insert 105 and left overmold insert 111 aid in the grip of the handle by the user.

In a specific embodiment, reinforcing strip 25 is 8.67 mm thick at the centre of mesh 5, and reinforcing plate 21 is 62.16 mm wide at the top where it attaches to rim 103.

The invention is not intended to be limited to the embodiments described herein, but rather the invention is intended to be applied widely within the scope of the inventive concept as defined in the specification as a whole including the appended claims.

What is claimed is:

1. A device comprising:
a perforated semi-spherical mesh container;
the perforated semi-spherical mesh container bearing at least one measurement indicator line;
a wiper aligned to closely slide along the inner surface of the perforated semi-spherical mesh container when rotated;
where the wiper is made with a flat edge that curves upwards in the middle, arranged so that the flat edge slides along the inside circumference of the mesh container, and the wiper is made of a plastic, silicone or rubber material: and
means for rotating said wiper.

2. The device of claim 1, where a reinforcing strip runs along a half circle of the outer surface of the semi-spherical mesh container.

3. A device comprising:
a perforated semi-spherical mesh container;
the perforated semi-spherical mesh container bearing at least one measurement indicator line;
a wiper aligned to closely slide along the inner surface of the perforated semi-spherical mesh container when rotated; and
means for rotating said wiper;
where the means for rotating said wiper comprises a handle adapted so that squeezing the handle rotates the wiper; and
where the wiper is made with a flat edge that curves upwards in the middle, arranged so that the flat edge slides along the inside circumference of the mesh container, and the wiper is made of a plastic, silicone or rubber material.

4. A device as defined in claim 3 where the perforated semi-spherical mesh container has hemispherical shape and the wiper has an outside circumference that is almost equal to the inside circumference of said perforated semi-spherical mesh container, said wiper being pivotally mounted to said perforated semi-spherical mesh container.

* * * * *